(12) United States Patent
Iwasaki

(10) Patent No.: US 8,593,509 B2
(45) Date of Patent: Nov. 26, 2013

(54) THREE-DIMENSIONAL IMAGING DEVICE AND VIEWPOINT IMAGE RESTORATION METHOD

(75) Inventor: Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/636,623

(22) PCT Filed: Nov. 9, 2010

(86) PCT No.: PCT/JP2010/069907
§ 371 (c)(1),
(2), (4) Date: Sep. 21, 2012

(87) PCT Pub. No.: WO2011/118077
PCT Pub. Date: Sep. 29, 2011

(65) Prior Publication Data
US 2013/0010086 A1 Jan. 10, 2013

(30) Foreign Application Priority Data

Mar. 24, 2010 (JP) ................................ 2010-068239

(51) Int. Cl.
*H04N 13/02* (2006.01)
(52) U.S. Cl.
USPC .............................................. 348/49; 348/46
(58) Field of Classification Search
USPC .............. 348/135, 222.1, 139, 140, 169, 170, 348/171, 172, 208.14, 46, 50, 231.2, 345, 348/49; 382/154, 103, 106, 107, 117, 118
See application file for complete search history.

(56) References Cited

U.S. PATENT DOCUMENTS

| 5,266,985 A | 11/1993 | Takagi |
|---|---|---|
| 6,233,003 B1 | 5/2001 | Ono |
| 6,822,758 B1 | 11/2004 | Morino |
| 2008/0165261 A1 | 7/2008 | Kamo |
| 2008/0297643 A1 | 12/2008 | Ono |
| 2009/0201411 A1 | 8/2009 | Ono |

FOREIGN PATENT DOCUMENTS

| JP | 4-73731 A | 3/1992 |
|---|---|---|
| JP | 10-42314 A | 2/1998 |

(Continued)

OTHER PUBLICATIONS

Edward R. Dowski, Jr., et al., "Wavefront Coding: jointly optimized optical and digital imaging systems", SPIE, Jun. 29, 2000, 7 pages.

*Primary Examiner* — Behrooz Senfi
(74) *Attorney, Agent, or Firm* — Sughrue Mion, PLLC

(57) ABSTRACT

A three-dimensional imaging device (10) according to an aspect of the present invention, which outputs first and second viewpoint images due to a pupil division on a light flux from a single imaging optical system (12, 14), includes a defocus map calculation unit (61) calculating a defocus map representing a defocus amount at each position in the first and second viewpoint images; a restoration filter storage (62) storing restoration filters corresponding to the defocus amount and an image height at each position in the viewpoint images, the restoration filters being deconvolution filters based on a point image intensity distribution representing an imaging performance of the imaging optical system; and a restoration unit (63) selecting a restoration filter, which corresponds to the defocus amount and the image height at each position in the viewpoint images, for each position in the first and second viewpoint images, and restoring the first and second viewpoint images by performing a deconvolution for each position in the first and second viewpoint images based on the selected restoration filter.

20 Claims, 13 Drawing Sheets

(56) References Cited

FOREIGN PATENT DOCUMENTS

| | | |
|---|---|---|
| JP | 2000-20691 A | 1/2000 |
| JP | 2005-62729 A | 3/2005 |
| JP | 2006-105771 A | 4/2006 |
| JP | 2008-33060 A | 2/2008 |
| JP | 2008-172321 A | 7/2008 |
| JP | 2008-211679 A | 9/2008 |
| JP | 2009-10944 A | 1/2009 |
| JP | 2009-527007 A | 7/2009 |
| JP | 2009-187092 A | 8/2009 |
| JP | 2009-188676 A | 8/2009 |
| JP | 2009-534722 A | 9/2009 |
| WO | 2007/095307 A1 | 8/2007 |
| WO | 2007/113800 A2 | 10/2007 |

(PRIMARY PIXELS)

(SECONDARY PIXELS)

FIG.3
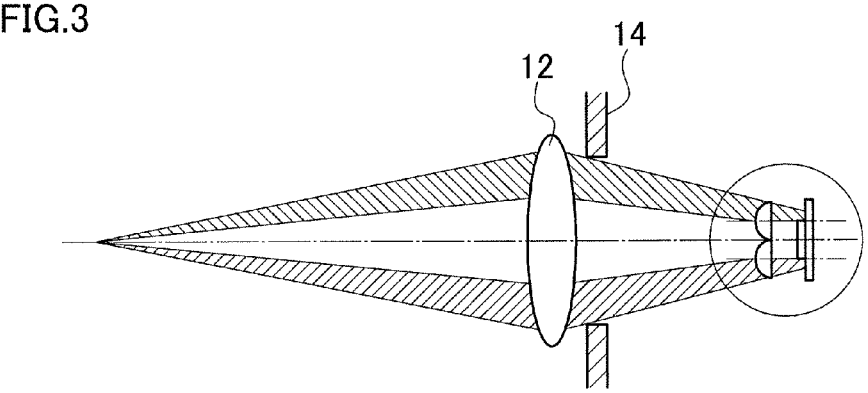
FIG.4A   NORMAL PIXEL
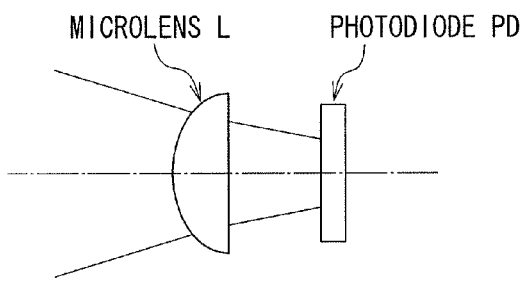
FIG.4B   PHASE DIFFERENCE PIXEL
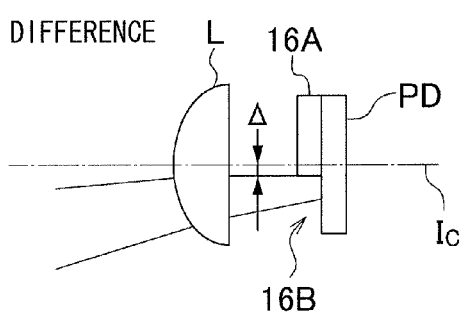

WIDE RIGHT

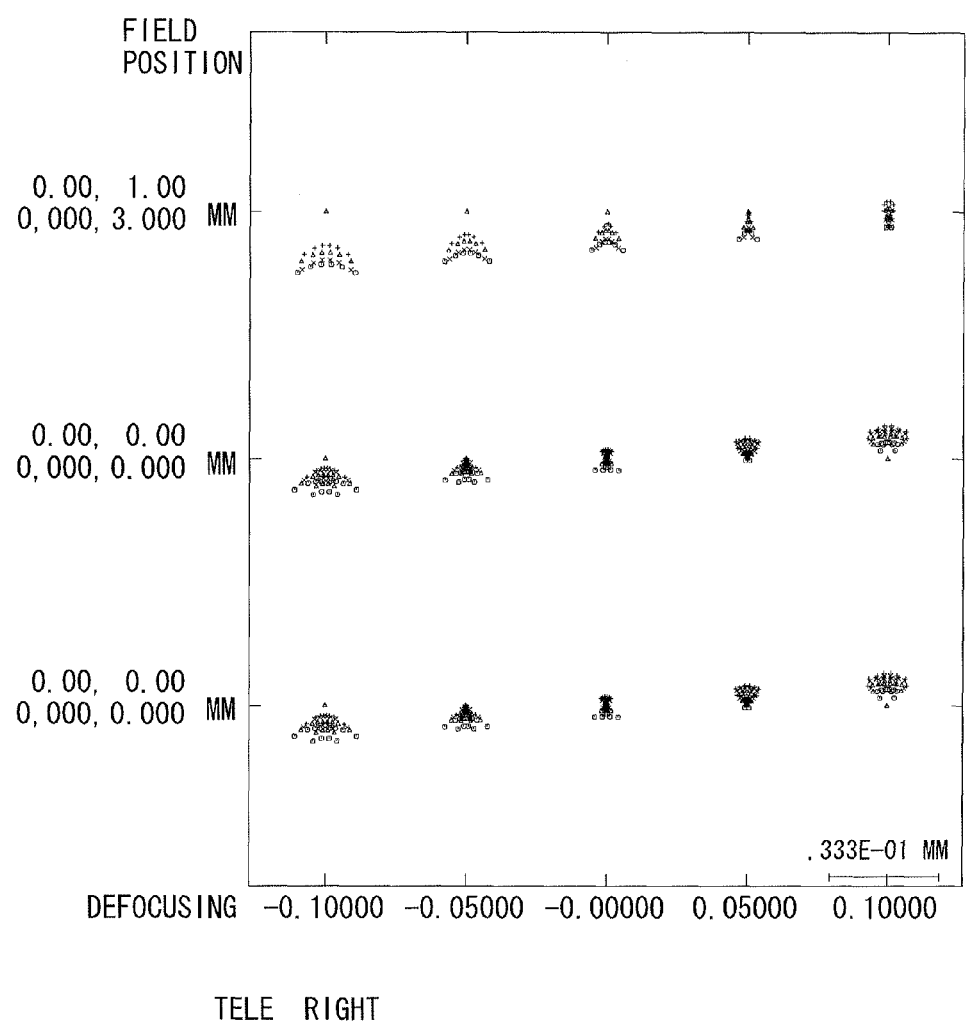

THREE-DIMENSIONAL IMAGING DEVICE AND VIEWPOINT IMAGE RESTORATION METHOD

CROSS REFERENCE TO RELATED APPLICATIONS

This application is a National Stage of International Application No. PCT/JP2010/069907, filed on Nov. 9, 2010, which claims priority from Japanese Patent Application No. 2010-068239, filed on Mar. 24, 2010, the contents of all of which are incorporated herein by reference in their entirety.

TECHNICAL FIELD

The present invention relates to a monocular imaging device, and specifically relates to a technology for imaging a subject image having passed through two regions of an image capturing lens different in direction on an image sensor, respectively and acquiring different viewpoint images.

BACKGROUND ART

Conventionally, from among this kind of monocular three-dimensional imaging device, one having an optical system illustrated in FIG. 9 is known (Patent Literature 1).

In this optical system, subject images passing through regions of a main lens 1 and relay lens 2 different in right and left directions undergo pupil division using a mirror 4, and form images on image sensors 7 and 8 via imaging lenses 5 and 6.

Portions (A) to (C) in FIG. 10 are diagrams illustrating separation of images imaged on the image sensors depending on differences at front focus, at focus (best focus) and at rear focus, respectively. In FIG. 10, for the purpose of comparison of differences of the separation depending on the focuses, the mirror 4 illustrated in FIG. 9 is omitted.

As illustrated in portion (B) in FIG. 10, images at focus out of images having undergone pupil division are formed at the same positions on the image sensors (coincident), whereas, as illustrated in portions (A) and (C) in FIG. 10, images at front focus and at rear focus are formed at different positions on the image sensors (separated).

Accordingly, by acquiring the subject images having undergone pupil division in the right and left directions via the image sensors 7 and 8, a left viewpoint image and a right viewpoint image different in viewpoint according to the subject distance (3D image) can be acquired.

There is proposed an imaging device capable of image capturing deep in depth of field and the like by regularly dispersing light flux using a phase plate and restoring due to a digital processing (Non-Patent Literature 1).

In a typical imaging optical system, a light ray concentrates most densely at the best focus position, and a blur diameter becomes wider approximately proportional to the defocus amount as separating from the best focus position. The shape of the blur is represented by a point spread function (PSF) (Patent Literature 2).

It is known that, when imaging an object body as a subject on an imaging plane of an image sensor via an optical system such as a zoom lens, the image captured by the image sensor has degraded image quality compared with the original object body due to the influence of aberration of the optical system causing blur. Image intensity distribution g of the image at this stage is indicated by $$g = f * h + n \ldots \quad (A)$$

where * denotes convolution integral, and convolution of luminance distribution f of the original object and point image intensity distribution h representing imaging performance of the optical system is added with noise n. When it is supposed that g, h and n are known, the luminance distribution f of the original object body can be calculated by equation (A). The technology for obtaining an ideal image by removing the blur of the optical system by the signal processing is called "restoration", "inverse convolution" or "deconvolution" of the image. A restoration filter based on the point image intensity distribution (PSF) is generated in consideration of information regarding degradation of the image in image capturing such as image capturing conditions (such as exposure time, amount of exposure, a distance to the subject and a focal distance) and characteristic information of the imaging device (such as optical characteristics of the lens and identification information of the imaging device), for example (Patent Literature 3).

A degradation model due to the blur can be expressed by a function. For example, Normal distribution with a parameter of a distance from the center pixel (image height) can express blur phenomenon (Patent Literature 4).

In addition, an optical transfer function (OTF) is two-dimensional Fourier transform to a frequency domain of PSF. Since conversion of PSF to OTF and vice versa thereof is easy, OTF can be regarded identical to PSF (Patent Literature 5).

A special optical system in which a defocus amount is unknown and PSF spreads similarly either at focus or out of focus is called EDof (Extended Depth of Field) (Patent Literatures 6 to 8). FIG. 11 illustrates one example of a deconvolution filter corresponding to PSF of EDof. This deconvolution filter is a filter corresponding to an image height (distance from the image center) at each position in the image. In FIG. 11, it is illustrated that an image height of 0 to r1, image height of r1 to r2 and image height r2 or more correspond to a filter a, filter b and filter c, respectively.

Patent Literature 9 describes one example of a viewpoint image input device.

Patent Literature 10 describes one example of a technology for detecting the image displacement amount (defocus amount) by dividing an imaging screen and performing focus detection of the subject for each divided region. In addition, since the image displacement amount depends on the distance to the subject, the image displacement amount can be regarded identical to the subject distance technically.

CITATION LIST

Patent Literature

{PTL 1} National Publication of International Patent Application No. 2009-527007
{PTL 2} Japanese Patent Application Laid-Open No. 2008-211679
{PTL 3} Japanese Patent Application Laid-Open No. 2008-172321
{PTL 4} Japanese Patent Application Laid-Open No. 2000-020691
{PTL 5} National Publication of International Patent Application No. 2009-534722
{PTL 6} Japanese Patent Application Laid-Open No. 2009-010944
{PTL 7} Japanese Patent Application Laid-Open No. 2009-187092
{PTL 8} Japanese Patent Application Laid-Open No. 2009-188676

{PTL 9} Japanese Patent Application Laid-Open No. 10-042314

{PTL 10} Japanese Patent Application Laid-Open No. 04-073731

Non-Patent Literature

{NPL 1} Edward R. Dowski, Jr., Robert H. Cormack, Scott D. Sarama, "Wavefront Coding; jointly optimized optical and digital imaging systems"

SUMMARY OF INVENTION

Technical Problem

As illustrated in FIG. 12A to FIG. 12C, light flux passing through an image capturing lens 12 of a monocular three-dimensional imaging device is emitted onto photodiodes PDma and PDmb or PDca and PDcb through microlenses Lm, Lc and the like. By shielding part of this emitted light flux onto the photodiodes with a light shielding member, viewpoint images can be obtained. As illustrated in FIG. 12C, in the center portion R1, which is a neighboring pixel group in a light receiving plane of a CCD 16, around the optical axis center IO of the image capturing lens 12, the light flux is incident uniformly with respect to a parallax direction (X direction) relative to the optical axis centers of the microlenses, and the photodiode PDca and photodiode PDcb can output point images in bilateral symmetry based on emitted light from the microlens Lc. On the other hand, as illustrated in FIG. 12B, in peripheral portions R2 and R3 in the light receiving plane of the CCD 16, the light flux is incident obliquely, and the photodiode PDma and photodiode PDmb output point images in asymmetry.

Namely, in the peripheral portions, imbalance of incident light flux between a right viewpoint pixel and a left view point pixel arises. Therefore, according to the position in the light receiving plane of the CCD 16, image quality between the viewpoint images is not uniform, and quality of the stereoscopic image deteriorates.

The present invention is made in view of the aforementioned circumstances and aims to provide a technology capable of improving quality of a stereoscopic image by making image quality between viewpoint images uniform regardless of positions of pixels without using a special optical system such as EDof.

Solution to Problem

There is provided a three-dimensional imaging device according to a first aspect of the present invention, which outputs first and second viewpoint images by a pupil division on a light flux from a single imaging optical system, including: a defocus map calculation unit calculating a defocus map representing a defocus amount at each position in the first and second viewpoint images; a restoration filter storage storing a restoration filter which corresponds to the defocus amount and an image height at each position in the viewpoint images and is a deconvolution filter based on a point image intensity distribution representing an imaging performance of the imaging optical system; and a restoration unit selecting the restoration filter, which corresponds to the defocus amount and the image height at each position in the viewpoint images, for each position in the first and second viewpoint images, and restoring the first and second viewpoint images by performing deconvolution for each position in the first and second viewpoint images based on the restoration filter thus selected.

There is provided a three-dimensional imaging device according to a second aspect of the present invention as set forth in the above-mentioned first aspect, wherein the restoration filter storage stores a restoration filter for each optical characteristic regarding the imaging optical system.

There is provided a three-dimensional imaging device according to a third aspect of the present invention as set forth in the above-mentioned second aspect, wherein the optical characteristic includes a focal distance and/or an aperture value.

There is provided a three-dimensional imaging device according to a fourth aspect of the present invention as set forth in the above-mentioned first to third aspects, wherein the restoration filter storage stores a restoration filter for each position along a parallax direction and the image height in the first and second viewpoint images.

There is provided a three-dimensional imaging device according to a fifth aspect of the present invention as set forth in the above-mentioned fourth aspect, wherein the restoration filter storage stores the restoration filter which corresponds to each of the image heights of small regions obtained by dividing a region in the first and second viewpoint images into a number N1 along the parallax direction and dividing the region in the first and second viewpoint images into a number N2 smaller than the number Ni along a direction perpendicular to the parallax direction.

There is provided a three-dimensional imaging device according to a sixth aspect of the present invention as set forth in the above-mentioned fourth and fifth aspects, wherein the restoration filter storage stores the restoration filter common to the first and second viewpoint images.

There is provided a three-dimensional imaging device according to a seventh aspect of the present invention as set forth in the above-mentioned sixth aspect, wherein the restoration unit restores, based on a reference restoration filter as the restoration filter which is stored in the restoration filter storage and corresponds to one of the first viewpoint image and the second viewpoint image, the one viewpoint image, and restores, after obtaining a mirror inversion restoration filter as a restoration filter corresponding to the other of the first viewpoint image and the second viewpoint image by performing mirror inversion on the reference restoration filter, the other viewpoint image based on the mirror inversion restoration filter.

There is provided a three-dimensional imaging device according to an eighth aspect of the present invention as set forth in the above-mentioned fourth to seventh aspects, wherein the restoration filter storage stores a restoration filter corresponding to the image height and the defocus amount for each small region of an image along one of positive and negative directions in the parallax direction.

There is provided a three-dimensional imaging device according to a ninth aspect of the present invention as set forth in the above-mentioned first to eighth aspects, including an output unit outputting a stereoscopic image based on the first and second viewpoint images obtained by the restoration unit restoring.

There is provided a viewpoint image restoration method according to a tenth aspect of the present invention, including: a step of calculating a defocus map representing a defocus amount at each position in the first and second viewpoint images obtained by pupil division on a light flux from a single imaging optical system; a step of storing a restoration filter which corresponds to the defocus amount and an image height at each position in the viewpoint images and is a deconvolution filter based on a point image intensity distribution representing an imaging performance of the imaging optical system; and a step of selecting the restoration filter, which corresponds to the defocus amount and the image height at each position in the viewpoint images, for each position in the first and second viewpoint images, and restoring the first and second viewpoint images by performing deconvolution for each position in the first and second viewpoint images based on the restoration filter thus selected.

There is provided a viewpoint image restoration method according to an eleventh aspect of the present invention as set forth in the above-mentioned tenth aspect, including a step of storing a restoration filter for each optical characteristic regarding the imaging optical system.

There is provided a viewpoint image restoration method according to a twelfth aspect of the present invention as set forth in the above-mentioned eleventh, wherein the optical characteristic includes a focal distance and/or an aperture value.

There is provided a viewpoint image restoration method according to a thirteenth aspect of the present invention as set forth in the above-mentioned tenth to twelfth aspects, including a step of storing a restoration filter for each position along a parallax direction and the image height in the first and second viewpoint images.

There is provided a viewpoint image restoration method according to a fourteenth aspect of the present invention as set forth in the above-mentioned thirteenth aspect, including a step of storing the restoration filter which corresponds to each of the image heights of small regions obtained by dividing a region in the first and second viewpoint images into a number N1 along the parallax direction and dividing the region in the first and second viewpoint images into a number N2 smaller than the number Ni along a direction perpendicular to the parallax direction.

There is provided a viewpoint image restoration method according to a fifteenth aspect of the present invention as set forth in the above-mentioned thirteenth or fourteenth aspect, including a step of storing the restoration filter common to the first and second viewpoint images.

There is provided a viewpoint image restoration method according to a sixteenth aspect of the present invention as set forth in the above-mentioned fifteenth aspect, including steps of: restoring, based on a reference restoration filter as the restoration filter which is stored and corresponds to one of the stored first viewpoint image and the second viewpoint image, the one viewpoint image; and restoring, after obtaining a mirror inversion restoration filter as a restoration filter corresponding to the other of the first viewpoint image and the second viewpoint image by performing mirror inversion on the reference restoration filter, the other viewpoint image based on the mirror inversion restoration filter.

There is provided a viewpoint image restoration method according to a seventeenth aspect of the present invention as set forth in the above-mentioned thirteenth to sixteenth aspect, including a step of storing a restoration filter corresponding to the image height and the defocus amount for each small region of an image along one of positive and negative directions in the parallax direction.

There is provided a viewpoint image restoration method according to an eighteenth aspect of the present invention as set forth in the above-mentioned tenth to seventeenth aspect, including a step of outputting a stereoscopic image based on the restored first and second viewpoint images.

Advantageous Effects of Invention

According to the present invention, since image quality at positions corresponding between individual viewpoint images is restored using a restoration filter according to an image height and a defocus amount, restoration is performed so as to make image quality between viewpoint images uniform even in a peripheral portion apart from an image center.

BRIEF DESCRIPTION OF DRAWINGS

FIG. 3 is a diagram illustrating each one primary pixel and each one secondary pixel.

FIG. 4A is an enlarged view of the essential portion in FIG. 3.

FIG. 4B is an enlarged view of the essential portion in FIG. 3.

FIG. 6A is a diagram illustrating one example of spread of a point image of each viewpoint image (right) in case of scaling position at a tele end.

DESCRIPTION OF EMBODIMENTS

Hereinafter, embodiments of a monocular three-dimensional imaging device according to the present invention will be described with reference to the accompanying drawings.

(Overall Configuration of Imaging Device)

Figure 1:
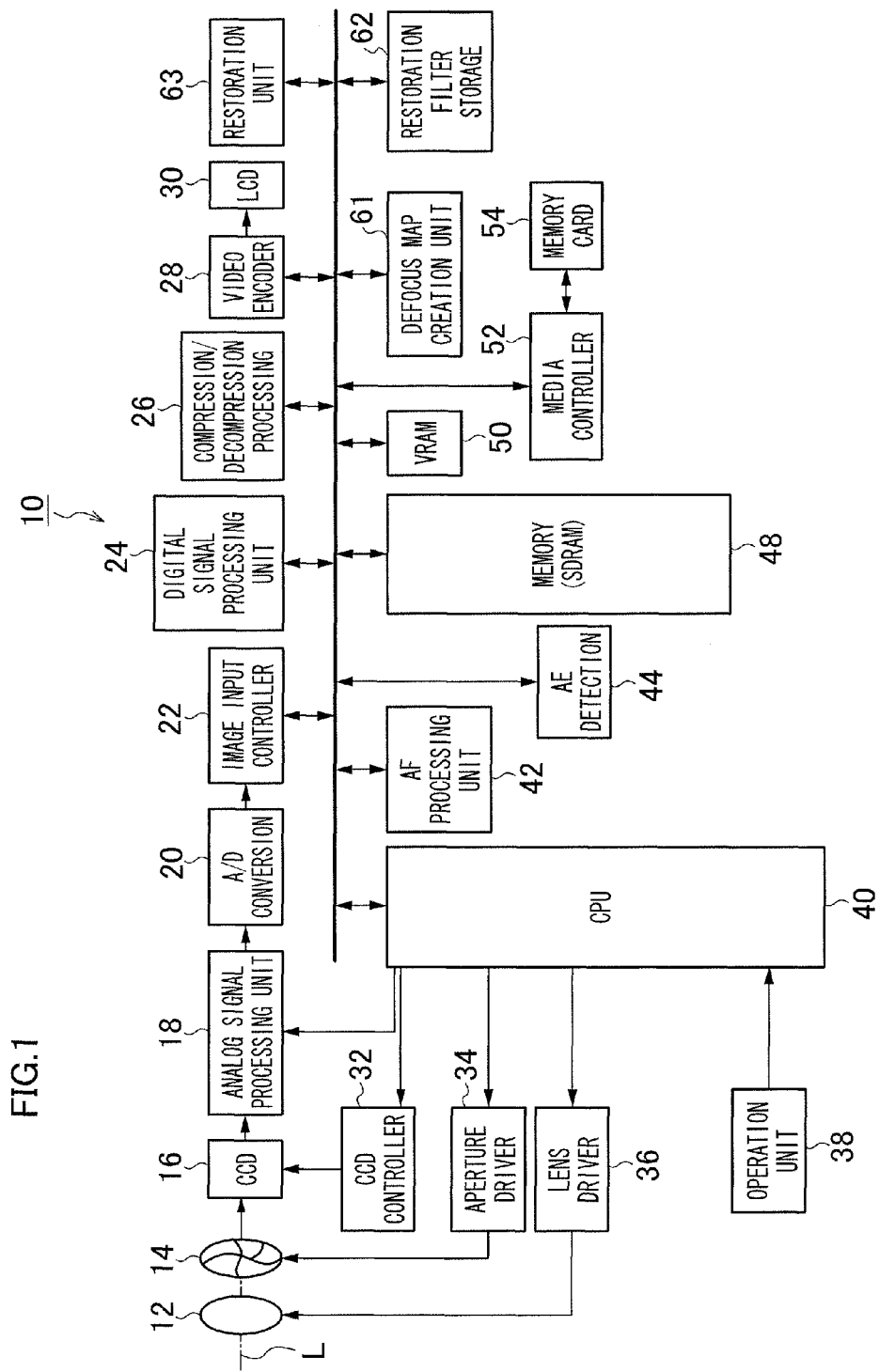
FIG. 1 is a block diagram of a monocular three-dimensional imaging device.

FIG. 1 is a block diagram illustrating an embodiment of a monocular three-dimensional imaging device 10 according to the present invention.

This monocular three-dimensional imaging device 10 records captured images in a memory card 54, and an overall operation of the device is integrally controlled by a central processing unit (CPU) 40.

The monocular three-dimensional imaging device 10 includes an operation unit 38 such as a shutter button, a mode dial, a playback button, a MENU/OK key, a cross key and a BACK key. Signals from the operation unit 38 are inputted to the CPU 40, and the CPU 40 controls individual circuits in the monocular three-dimensional imaging device 10 based on the inputted signals to perform, for example, lens driving control, aperture driving control, image capturing operation control, image processing control, recording/playback control of image data, display control of a liquid crystal monitor 30 for three-dimensional display, and the like.

The shutter button is an operation button for inputting an instruction to start image capturing, and is a two-stroke switch having an S1 switch switched ON at a half push and an S2 switch switched ON at a full push. The mode dial is a selecting operation member for selecting any of an auto image capturing mode for capturing a still picture, a manual image capturing mode, a scene position for images of persons, landscapes, night scenes and the like, and a motion picture mode for capturing a motion picture.

The playback button is a button for switching to a playback mode to display, on the liquid crystal monitor 30, still pictures or motion pictures of the stereoscopic view images (3D images) and planar images (2D images) which have been captured and recorded. The MENU/OK key is a manipulation key serving as a menu button for issuing an instruction to display a menu on the screen of the liquid crystal monitor 30 and also serving as an OK button for issuing an instruction to confirm and execute selected content as well. The cross key is an operation unit that inputs an instruction as to the four directions up, down, left and right and serves as a button (a cursor transferring manipulation member) for selecting an item from the menu screen and instructing the selection of various setting items from each menu. Moreover, the up/down key of the cross key serves as a zoom switch in image capturing or a playback zoom switch in the playback mode, and the left/right key serves as a page scroll (forward/backward scroll) button in the playback mode. The BACK key is used to delete a desired item such as a selected item and cancel an instruction or return to a previous operation state.

In the image capturing mode, an image light indicating the subject is imaged onto a light receiving plane of a solid-state image sensor 16 (hereinafter referred to as a "CCD (charge-coupled device)") which is a phase-difference image sensor capable of acquiring pupil division viewpoint images through an image capturing lens 12 and an aperture 14. The image capturing lens 12 is driven by a lens driver 36 controlled by the CPU 40, and focus control, zoom (focal distance) control and the like. The aperture 14 is made up of five aperture leaf blades, for example, and driven by an aperture driver 33 controlled by the CPU 40, and is controlled in five steps of the aperture value (F value) from F2.8 to F11 on an AV basis, for example.

Moreover, the CPU 40 controls the aperture 14 using the aperture driver 34 and also controls charge accumulation time (shutter speed) in the CCD 16, readout of image signals from the CCD 16, and the like using a CCD controller 32.

(Exemplary Configuration of CCD)

Figure 2A:
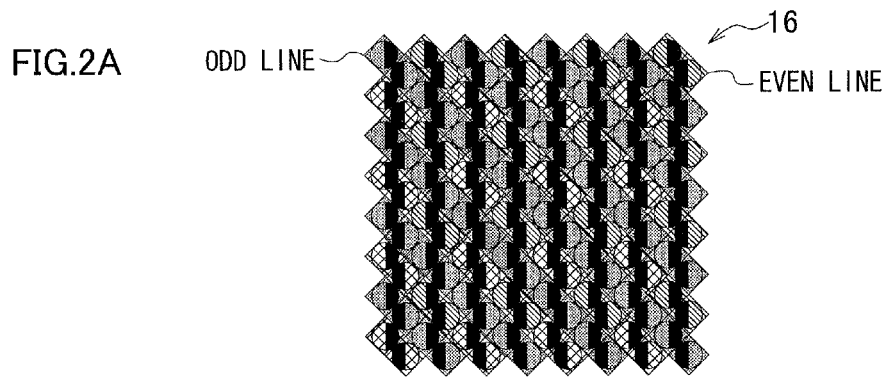
FIG. 2A is a diagram illustrating an exemplary configuration of a pupil division viewpoint image acquisition image sensor CCD.
Figure 2B:
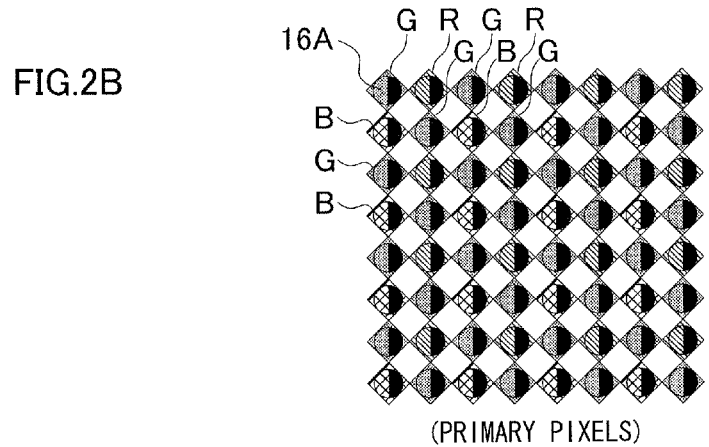
FIG. 2B is a diagram illustrating an exemplary configuration of the pupil division viewpoint image acquisition image sensor CCD (primary pixels).
Figure 2C:
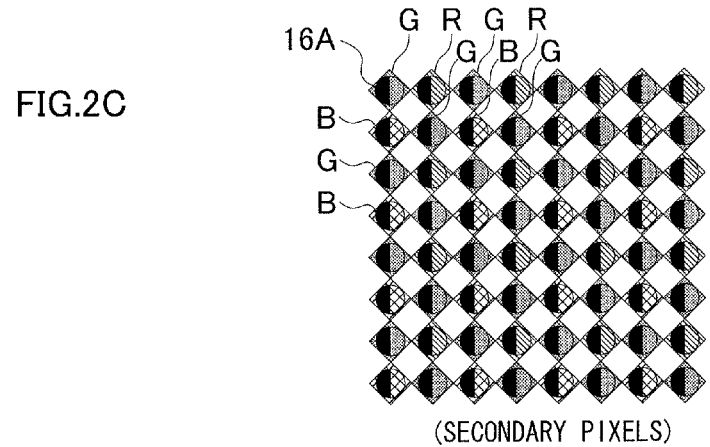
FIG. 2C is a diagram illustrating an exemplary configuration of the pupil division viewpoint image acquisition image sensor CCD (secondary pixels).

FIG. 2A to FIG. 2C are diagrams illustrating an exemplary configuration of the CCD 16.

The CCD 16 has odd line pixels (primary pixels) and even line pixels (secondary pixels) each being arranged in a matrix shape, so that two frames of image signals having undergone photoelectric conversion individually in these primary and secondary pixels can be read out independently. A plurality of light receiving elements corresponding to the respective pixel groups form an effective pixel region for obtaining effective imaging signals and an optical black region (hereinafter referred to as an "OB region") for obtaining a reference signal of black level. The OB region is formed so as to surround the periphery of the effective pixel region practically.

As illustrated in FIG. 2A to FIG. 2C, as to the odd lines (1, 3, 5, . . .) of the CCD 16, among the pixels having color filters of R (red), G (green) and B (blue), a line of a pixel arrangement of G, R, G, R, . . . and a line of a pixel arrangement of B, G, B, G, . . . are arranged alternately. On the other hand, as to the pixels in the even lines (2, 4, 6, . . . ), similarly to the odd lines, a line of a pixel arrangement of G, R, G, R, . . . and a line of a pixel arrangement of B, G, B, G, . . . are arranged alternately, and also are arranged so as to shift in the arrangement direction by an amount of a half pitch with respect to the pixels in the even lines.

FIG. 3 is a diagram illustrating the image capturing lens 12, the aperture 14, and each one primary and each one secondary pixels of the CCD 16, and FIG. 4A and FIG. 4B are enlarged views of the essential portion in FIG. 3.

As illustrated in FIG. 4A, on a pixel of a typical CCD (photodiode PD), light flux passing through an exiting pupil incident through a micro-lens L without being blocked.

In contrast, as illustrated in FIG. 4B, a light shielding member 16A is formed on the primary pixel and secondary pixel of the CCD 16. In the case of image capturing at a landscape position of the monocular three-dimensional imaging device 10, a right half or left half of the light receiving plane of the primary pixel and secondary pixel (photodiode PD) is shielded by this light shielding member 16A. Otherwise, in the case of image capturing at a portrait position of the monocular three-dimensional imaging device 10, an upper half or lower half of the light receiving plane of the primary pixel and secondary pixel (photodiode PD) is shielded by this light shielding member 16A. An opening 16B of the light shielding member 16A is disposed at the position which displaces by a predetermined amount A from the light axis Z of the microlens L in the right, left, top or bottom (for example, in the left from the light axis in FIG. 4B). The light flux passes through the opening 16B and reaches the light receiving plane of the photodiode PD. Namely, the light shielding member 16A functions as a pupil division member.

Figure 9:
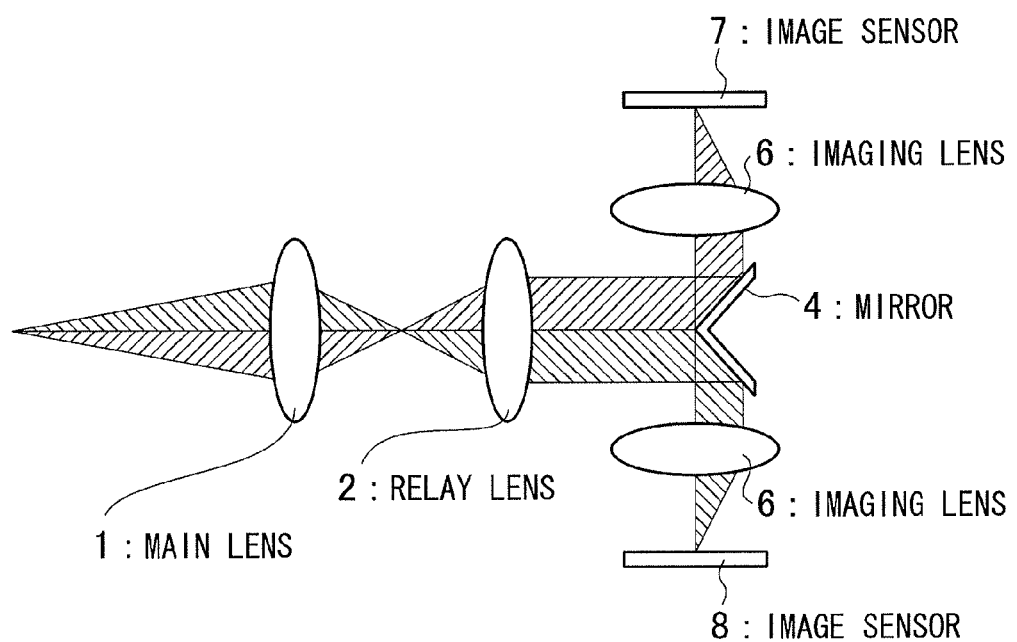
FIG. 9 is a diagram illustrating one example of a conventional monocular three-dimensional imaging device.
Figure 10:
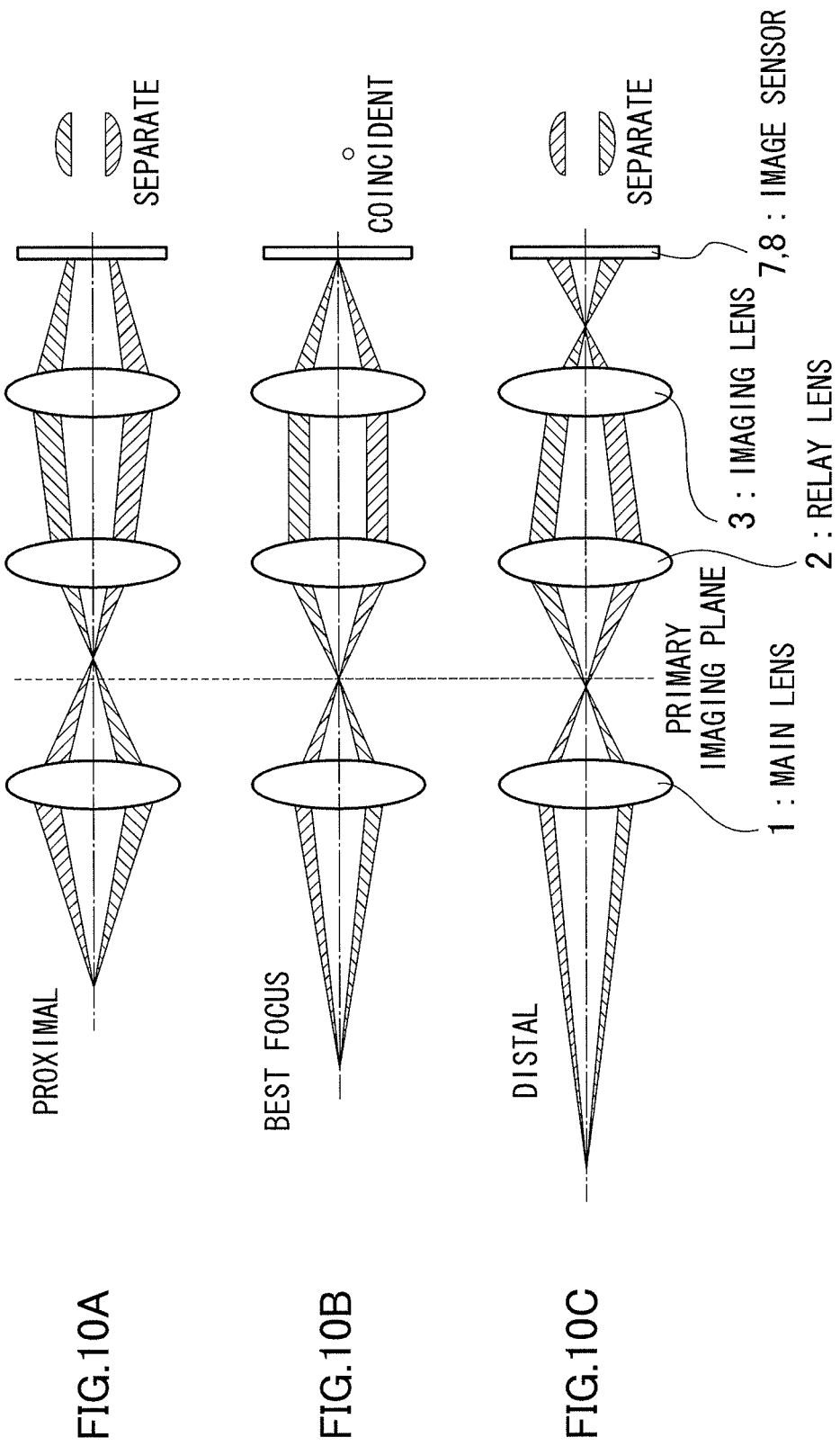
FIG. 10 is a diagram illustrating separation status of images imaged on imaging sensors.
Figure 11:
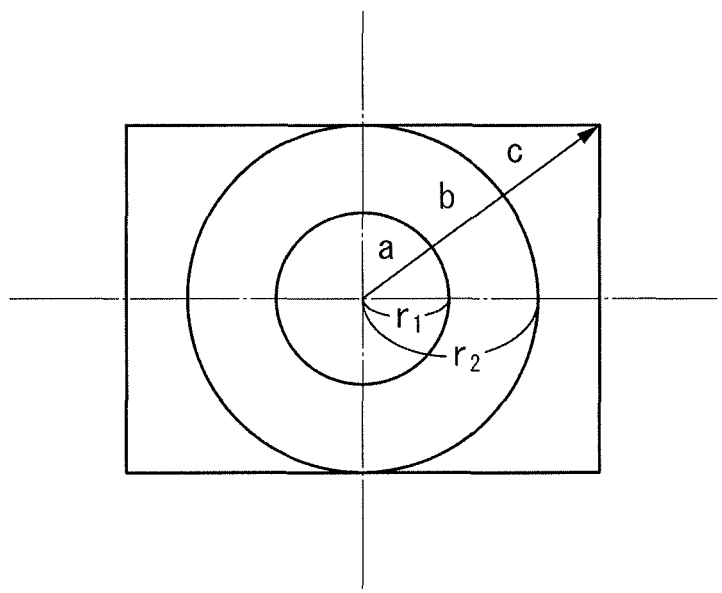
FIG. 11 is a diagram exemplarily illustrating a deconvolution filter corresponding to PSF of EDof.
Figure 12A:
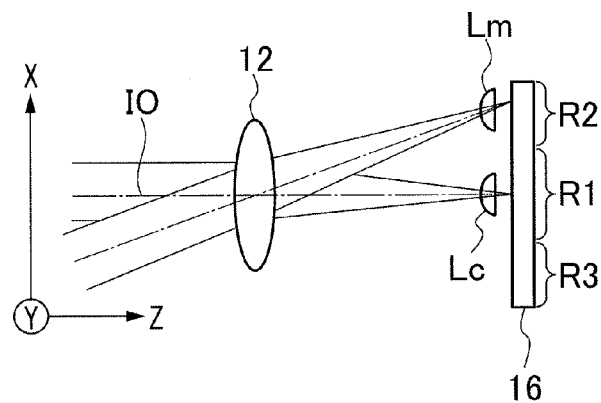
FIG. 12A is a diagram illustrating one example of imbalance of light receiving between a primary pixel and a secondary pixel.
Figure 12B:
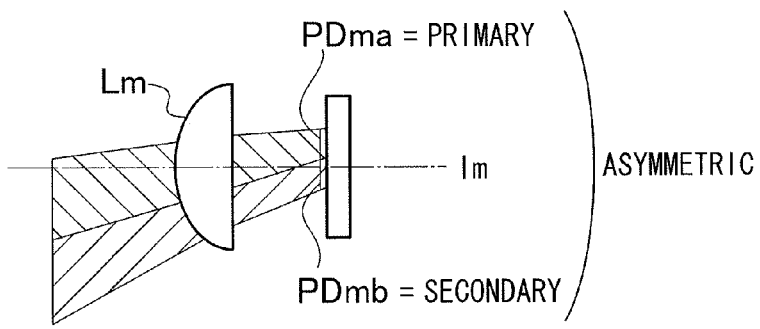
FIG. 12B is an enlarged view illustrating one example of imbalance of light receiving between the primary pixel and the secondary pixel.
Figure 12C:
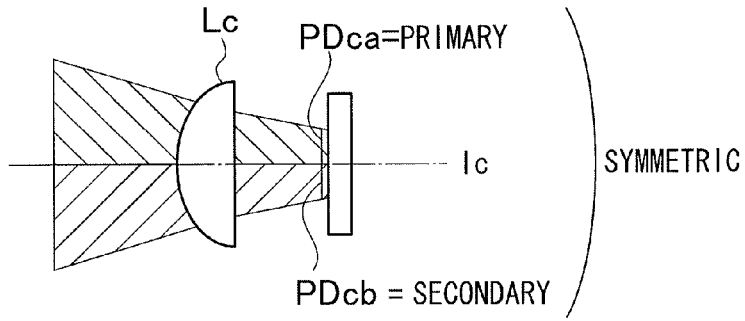
FIG. 12C is an enlarged view illustrating one example of imbalance of light receiving between the primary pixel and the secondary pixel.

In addition, the region (the right half/left half or the upper half/lower half) where the light flux is blocked by the light shielding member 16A is different from the primary pixel to the secondary pixel. For example, when the left half of the light flux is blocked for the primary pixel and the right half of the light flux is blocked for the secondary pixel, the right viewpoint image is obtained from the primary pixel and the left viewpoint image from the secondary pixel. Otherwise, when the upper half of the light flux is blocked for the primary pixel and the lower half of the light flux is blocked for the secondary pixel, the lower viewpoint image is obtained from the primary pixel and the upper viewpoint image from the secondary pixel. The CCD 16 with the above-mentioned configuration is configured such that the region (right half or left half) where the light flux is blocked by the light shielding member 16A is different from the primary pixel to the secondary pixel, whereas the configuration of the CCD 16 is not limited to this. The light flux incident on the photodiode PD may be blocked due to the directional shift implemented by relatively shifting the microlens L and photodiode PD rightward and leftward without the light shielding member 16A. Otherwise, the light flux incident on each pixel may be blocked by providing one microlens for two pixels (primary pixel and secondary pixel) (for example, see FIG. 12A to FIG. 12C), or due to pupil division using mirrors (for example, FIG. 9).

Returning to FIG. 1, signal charge accumulated in the CCD 16 is read out as a voltage signal corresponding to the signal charge based on a readout signal supplied from the CCD controller 32. The voltage signal read out from the CCD 16 is supplied to an analog signal processing unit 18, in which R, G and B signals for each pixel undergo sample-and-hold and amplification and are then supplied to an A/D converter 20. The A/D converter 20 converts the R, G and B signals supplied sequentially into digital R, G, and B signals and outputs them to an image input controller 22.

A digital signal processing unit 24 performs predetermined signal processing on the digital image signals inputted through the image input controller 22, which processing includes an offset processing, a gain control processing containing a white balance correction and a sensitivity correction, a gamma correction processing, a YC processing, and the like.

Herein, as illustrated in FIG. 2B and FIG. 2C, primary pixel image data read out from the primary pixels in the odd lines of CCD 16 is processed as left viewpoint image data, and secondary image data read out from the secondary pixels in the even lines is processed as right viewpoint image data.

The left viewpoint image data and right viewpoint image data (3D image data) processed by the digital signal processing unit 24 are inputted to a VRAM (Video Random Access Memory) 50. The VRAM 50 includes an A region and B region each of which stores 3D image data representing a 3D image for one frame. In the VRAM 50, the 3D image data representing a 3D image for one frame is overwritten to the A region and B region alternately. Among the A region and B region of the VRAM 50, 3D image data having been overwritten is read out from a region other than the region where 3D image data is being overwritten. The 3D image data read out from the VRAM 50 is encoded by a video encoder 28 and outputted to a stereoscopic liquid crystal monitor (LCD: Liquid Crystal Display) 30 provided on the rear side of a camera, and thereby the 3D subject image is displayed on the display screen of the liquid crystal monitor 30.

This liquid crystal monitor 30 is a stereoscopic display device capable of displaying stereoscopic images (left viewpoint image and right viewpoint image) as directional images having individual predetermined directivities due to a parallax barrier, being not, however, limited to this, whereas it may include a use of a lenticular lens, or a use of special glasses such as polarization glasses and liquid crystal shutter glasses, facilitating individual views of the left viewpoint image and right viewpoint image.

Moreover, when the shutter button of the operation unit 38 is at the first pressed stage (half push), the CPU 40 starts an AF (Automatic Focus) operation and an AE (Automatic Exposure) operation, so that a focusing lens in the image capturing lens 12 is controlled so as to be at the focusing position by the lens driver 36. Moreover, when the shutter button is at the half push state, the image data outputted from the A/D converter 20 are taken into an AE detecting unit 44.

The AE detecting unit 44 integrates the G signals of the whole screen or integrates the G signals with weighting factors differently applied to the central portion and peripheral portion of the screen, and outputs the integrated value to the CPU 40. The CPU 40 calculates brightness (photographic Ev value) of the subject from the integrated value inputted from the AE detecting unit 44, based on this photographic Ev value, determines an aperture value of the aperture 14 and an electronic shutter (shutter speed) of the CCD 16 in accordance with a predetermined programmed diagram, controls the aperture 14 using the aperture driver 34 based on the aperture value thus determined, and controls charge accumulation time in the CCD 16 using the CCD controller 32 based on the determined shutter speed thus determined.

An AF processing unit 42 is a section performing contrast AF processing or phase difference AF processing. When the contrast AF processing is performed, a high-frequency component of image data in a predetermined focus region among at least one of the left viewpoint image data and right viewpoint image data is extracted, and an AF estimate value representing focusing status is calculated by integrating the high-frequency component. The AF control is performed by controlling the focusing lens in the image capturing lens 12 so as to maximize the AF estimate value. Moreover, when the phase difference AF processing is performed, a phase difference between image data corresponding to the primary pixel and secondary pixel in a predetermined focus region among the left viewpoint image data and right viewpoint image data is detected, and a defocus amount is calculated based on information representing this phase difference. The AF control is performed by controlling the focusing lens in the image capturing lens 12 such that this defocus amount becomes 0.

When the AE operation and AF operation are finished and the shutter button is at the second pressed stage (full push), in response to the pressing, two pieces of image data of the left viewpoint image (primary pixel image) and right viewpoint image (secondary pixel image) corresponding to the primary pixel and secondary pixel outputted from the A/D converter 20 are inputted from the image input controller 22 to a memory (SDRAM: Synchronous Dynamic Random Access Memory) 48, and temporarily stored therein.

The two pieces of image data temporarily stored in the memory 48 are appropriately read out by the digital signal processing unit 24, in which predetermined signal processing on the image data is performed, which processing includes generation processing of luminance data and chromaticity data (YC processing). The image data having undergone YC processing (YC data) is stored in the memory 48 again. Subsequently, the two pieces of YC data are outputted to a compression/decompression processing unit 26 and undergo predetermined compression processing such as JPEG (Joint Photographic Experts Group), and after that, are then stored in the memory 48 again.

From the two pieces of YC data (compressed data) stored in the memory 48, a multipicture file (MP file: a file in a format wherein a plurality of images are connected) is generated, and the MP file is read out by a media controller 52 and recorded in a memory card 54.

A defocus map creation unit 61 calculates a phase difference corresponding to the primary pixel and secondary pixel not only for each of small regions included in a predetermined focus region but for each of a plurality of small regions substantially covering the whole effective pixel region. The plurality of small regions, which substantially cover the whole effective pixel region, do not necessarily cover the whole effective pixel region completely, but may be arranged densely or coarsely over the whole effective pixel region. For example, the phase difference is calculated for each of divided regions obtained by dividing the effective pixel region into predetermined matrix-like units (for example, 8×8 pixels), or smaller ones (for example, 1×1 pixel), or larger ones (for example, 10×10 pixels). Otherwise, the phase difference is calculated for each of divided regions in predetermined units between which there are predetermined separation pitches starting from the origin on the outer edge of the effective pixel region (for example, corresponding to one divided region, or larger size, or smaller size). In short, the phase differences are calculated over the whole effective pixel region, whereas they are not necessarily calculated for all the small regions constituting the effective pixel region.

The defocus map creation unit 61 obtains a defocus amount corresponding to each of the above-mentioned small regions based on the phase differences calculated for the above-mentioned individual small regions. A set of these defocus amounts which are calculated over the whole effective pixel region and correspond to the individual small regions is referred to as a defocus map. The defocus map creation unit 61 includes a volatile recording medium such as a RAM (Random Access Memory) and stores the obtained defocus map temporarily. In addition, similarly to Patent Literature 10, since the defocus amount is equivalent to subject distance information, the defocus map is equivalent to subject distance information corresponding to the individual small regions. The defocus map creation unit 61 may detect feature points and corresponding points between the individual viewpoint images and create the defocus map based on a difference of position information between these feature points and corresponding points.

A restoration filter storage 62 is constituted of a non-volatile recording medium such as a ROM (Read-Only Memory) and stores a restoration filter (first filter) corresponding to an image height of each small region in each viewpoint image (a distance from the image center, typically a distance from the light axis center L of the image capturing lens 12) and a defocus amount (or a subject distance).

Preferably, this restoration filter is generated beforehand for each relation between optical characteristics such as a focal distance and an F-value and PSF similarly to Patent Literatures 2 and 3. In other words, a restoration filter (second filter) according to an image height and defocus amount is stored individually for the optical characteristics.

This is because spread of a point image of each viewpoint image is different according to the focal distance and the like and the image height and defocus amount, and is associated with the PSF.

Figure 5A:
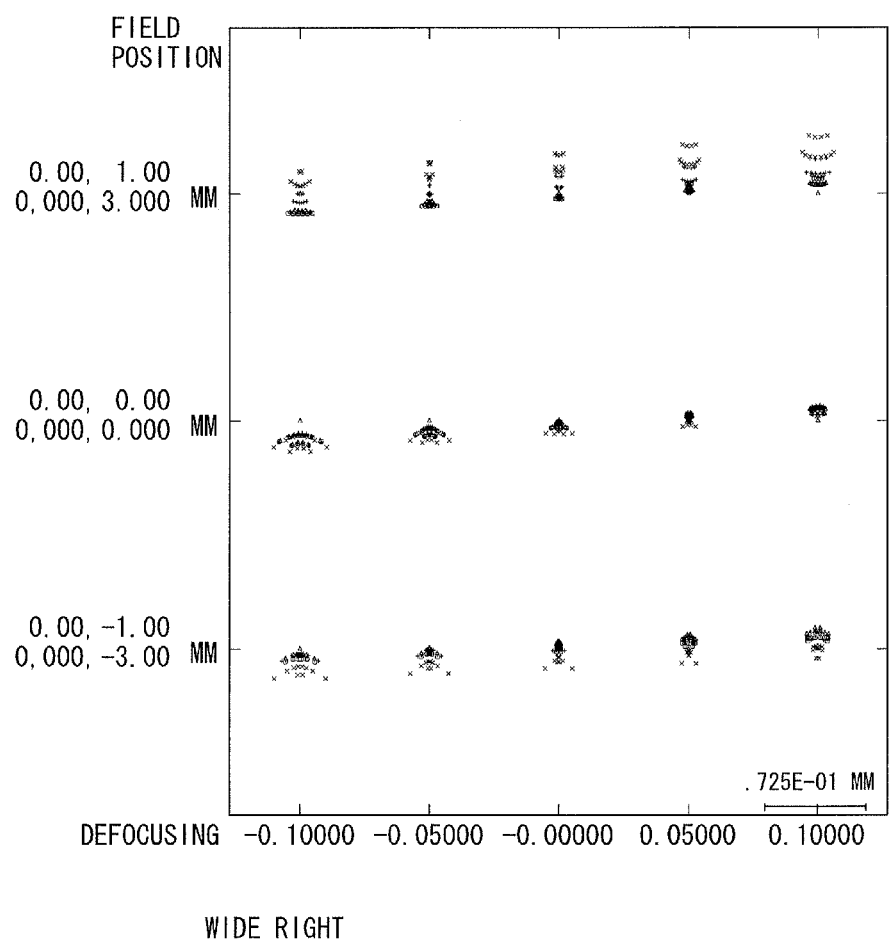
FIG. 5A is a diagram illustrating one example of spread of a point image of each viewpoint image (right) in case of scaling position at a wide end.
Figure 5B:
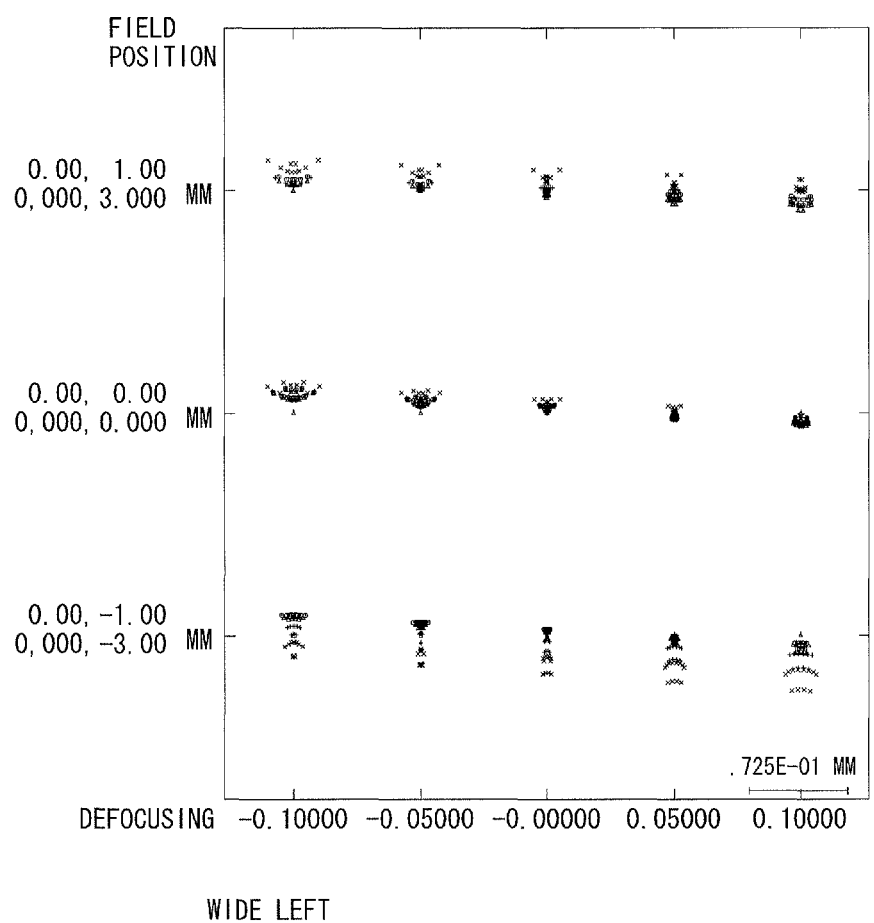
FIG. 5B is a diagram illustrating one example of spread of a point image of each viewpoint image (left) in case of scaling position at a wide end.
Figure 6B:
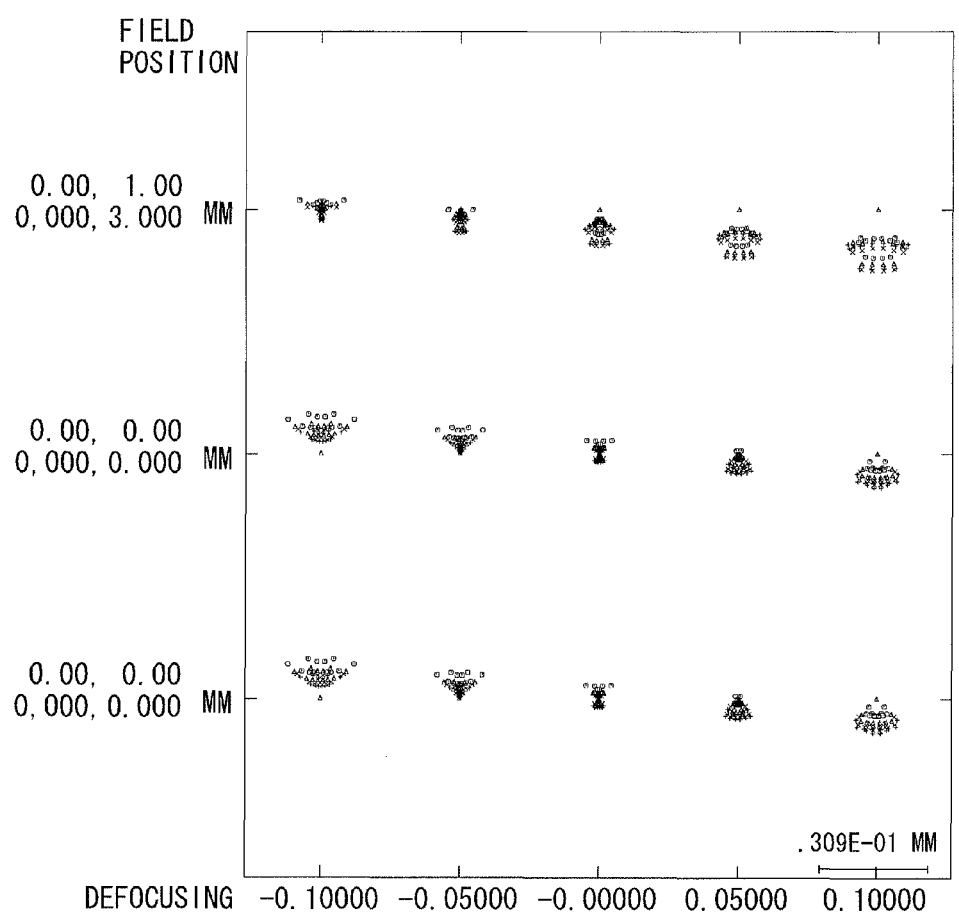
FIG. 6B is a diagram illustrating one example of spread of a point image of each viewpoint image (left) in case of scaling position at a tele end.

FIG. 5A and FIG. 5B illustrate one example of spread of a point image of each viewpoint image in the case of the scaling position of the zoom lens of the image capturing lens 12 at a wide end, and FIG. 6A and FIG. 6B illustrate one example of spread of a point image of each viewpoint image in the case of the scaling position of the zoom lens of the image capturing lens 12 at a tele end.

Figure 7A:
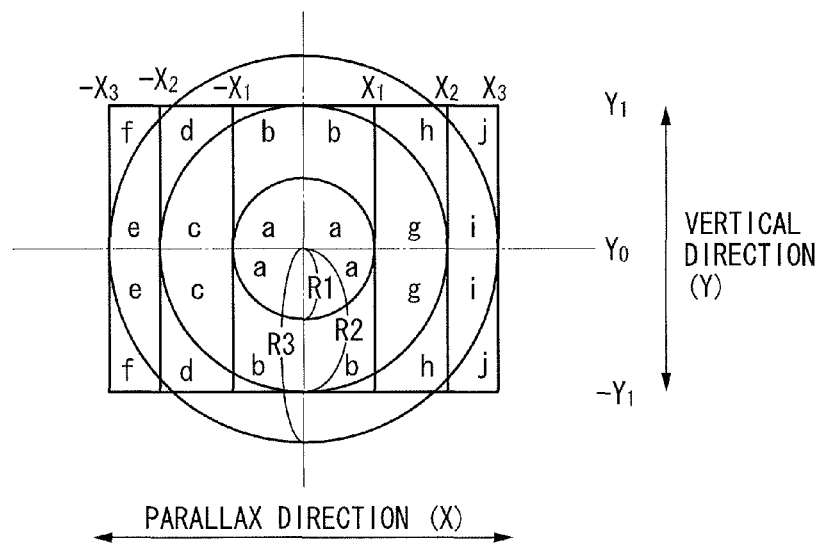
FIG. 7A is a diagram exemplarily illustrating a restoration filter corresponding to an image height and a parallax direction.
Figure 7B:
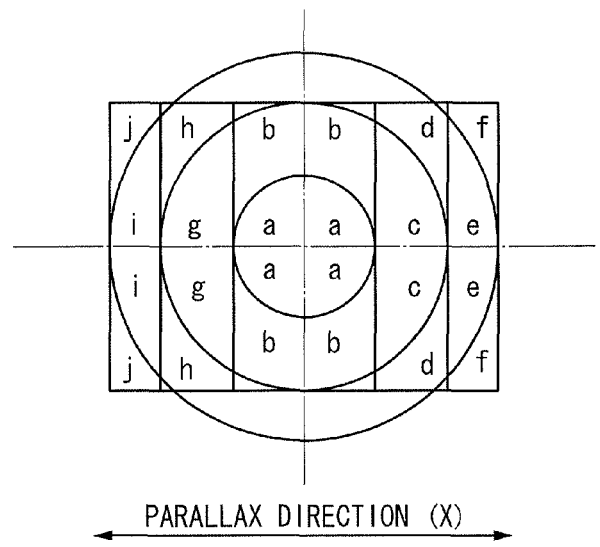
FIG. 7B is a diagram exemplarily illustrating a restoration filter corresponding to an image height and a parallax direction.

Also preferably, the restoration filter storage 62 stores a restoration filter (third filter) which corresponds an image height and defocus amount of each small region of the viewpoint image along the parallax direction and is common to the right and left viewpoint images. This is because there is low necessity for restoration using this filter corresponding to the image height since difference in image quality caused by difference in image height in a direction other than the parallax direction hardly has an influence on the stereoscopic view image. Moreover, reduction of memory consumption is realized by storing the restoration filter common to the right and left viewpoint image in the parallax direction. FIG. 7A and FIG. 7B illustrate one example of the third filter. Among these, FIG. 7A illustrates the restoration filter corresponding to one viewpoint image, for example, the right viewpoint image, and FIG. 7B illustrates the restoration filter corresponding to the other viewpoint image, for example, the left viewpoint image.

The restoration filter in FIG. 7A and the restoration filter in FIG. 7B have mirror inversion relation relative to their image center (position with the image height of 0). The restoration filter storage 62 stores the restoration filter corresponding to any one of the viewpoint images, and the restoration unit 63 performs mirror inversion on one restoration filter, which is stored, relative to its image center and obtains a restoration filter corresponding to the other viewpoint image. With each zone obtained by dividing the viewpoint image according to sets of distances ±X1 to ±X3 in the parallax direction (X), distances Y0 to ±Y1 in the direction (Y) perpendicular to the parallax direction, and image heights R1 to R3 from the image center, the restoration filter is associated. The division into zones is performed predetermined times along the parallax direction (X) and the direction (Y) perpendicular to the parallax direction. In FIG. 7A and FIG. 7B as one example, the number N1 of the division into zones along the parallax direction (X) equals to 6, and the number N2 of the division into zones along the direction (Y) perpendicular to the parallax direction equals to 2. More typically, for the purpose of enhancing quality of the restoration in the parallax direction, N1>N2, and the finer division into zones and the association of the restoration filter with the relevant zone are performed along the parallax direction.

More preferably, the restoration filter storage 62 stores a restoration filter (fourth filter) which corresponds an image height and defocus amount of each small region of the viewpoint image along one direction of positive (right) or negative (left) in the parallax direction. The same distance from the screen center as an image height of the small region along the parallax direction affords the same optical characteristics corresponding to the image height. It is expected that the relevant small region can be restored using the same restoration filter regardless of the small region being the positive side (right side) or negative side (left side) from the center. Therefore, reduction of memory consumption is achieved by using the same restoration filter for the same distance regardless of the direction of the image height.

Figure 8:
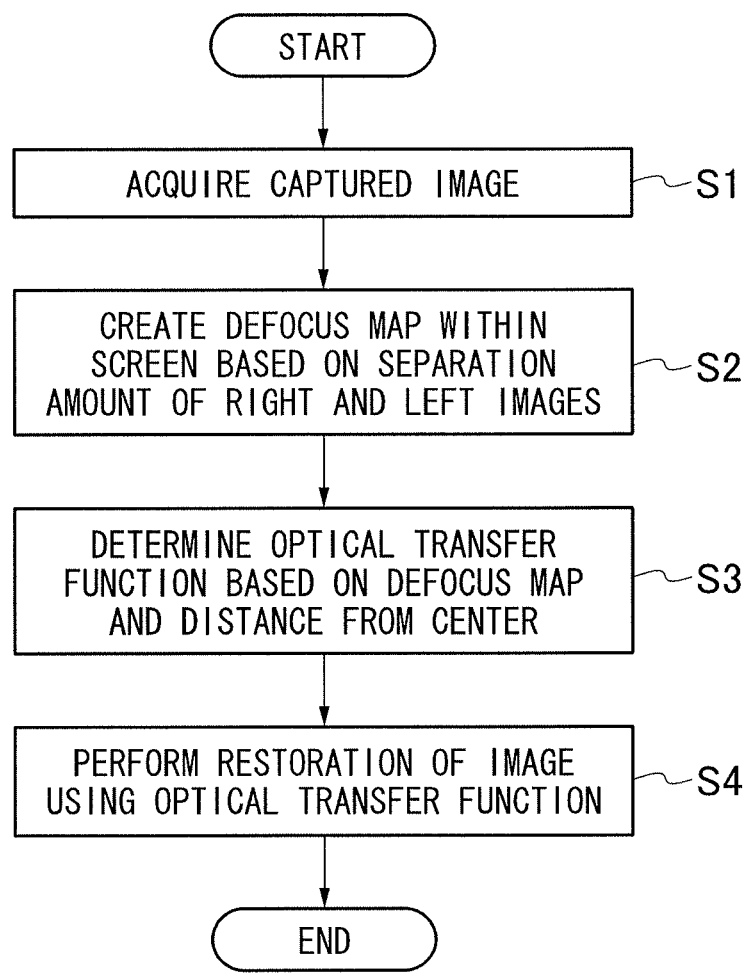
FIG. 8 is a flowchart of restoration processing.

The restoration unit 63 is constituted of an information processing device such as the CPU 40 and performs the following processes. FIG. 8 is a flowchart of restoration processing which the monocular three-dimensional imaging device 10 performs. In addition, creation of the defocus map, storing of the restoration filter, restoration processing of the viewpoint images using the restoration filter, output processing of the restored viewpoint images and the like can be performed by an information processing device other than the monocular three-dimensional imaging device 10, for example, a personal computer or the like. A program for causing the monocular three-dimensional imaging device 10 or other information processing devices to perform the following processes is recorded in a computer-readable recording medium such as a ROM and a CD-ROM.

In S1, the restoration unit 63 configures small regions substantially covering each viewpoint image acquired actually from the CCD 16. The units for these small regions (positions and dividing sizes) are same as those for the small regions in the restoration filter storage 62.

In S2, the defocus map creation unit 61 creates the above-mentioned defocus map. In S3, the restoration unit 63 identifies the image height and defocus amount of each small region configured in each viewpoint image. The identification of the image height of each small region can be performed by calculating the shortest distance from the image center to each small region. Moreover, the identification of the defocus amount of each small region is performed based on the defocus map which the defocus map creation unit 61 creates, for each viewpoint image. The restoration unit 63 selects the restoration filter corresponding to the image height and defocus amount of the small region, which the image height and defocus amount is identified for each viewpoint image, from the restoration filter storage 62.

In S4, the restoration unit 63 performs deconvolution of the relevant small region using the restoration filter selected for each small region of each viewpoint image, and restores the corresponding small region in the viewpoint image. When the restoration filter of the restoration filter storage 62 is the first filter, the restoration unit 63 selects the restoration filter corresponding to the image height and defocus amount of the small region, which are identified for each viewpoint image, from the restoration filter storage 62, performs the deconvolution of the relevant small region using the restoration filter selected for each small region of each viewpoint image, and restores the corresponding small region in the viewpoint image.

When the restoration filter of the restoration filter storage 62 is the second filter, the restoration unit 63 acquires the optical characteristics such as the focal distance and F-value from the CPU 40, lens driver 36, aperture driver 34 and the like, selects the restoration filter corresponding to the image height and defocus amount of small region, which correspond to the acquired optical characteristics and are identified for each viewpoint image from the restoration filter storage 62, performs the deconvolution of the relevant small region using the restoration filter selected for each small region of each viewpoint image, and restores the corresponding small region in the viewpoint image.

When the restoration filter of the restoration filter storage 62 is the third filter, the restoration unit 63 selects the common restoration filter corresponding to the image height and defocus amount along the parallax direction of the small region, which are commonly configured for the individual viewpoint images from the restoration filter storage 62, performs the deconvolution of the relevant small region using the restoration filter which is selected for each small region of each viewpoint image and is common to the individual viewpoint images, and restores the corresponding small region in the viewpoint image.

When the restoration filter of the restoration filter storage 62 is the fourth filter, the restoration unit 63 selects the restoration filter corresponding to the image height and defocus amount along the parallax direction of the small region common to the individual viewpoint images from the restoration filter storage 62, performs the deconvolution of the relevant small region using the common restoration filter selected for each small region of each viewpoint image, and restores the corresponding small region in the viewpoint image. At this stage, in the case of the same distance from the screen center as an image height of the small region along the parallax direction, the restoration unit 63 restores the relevant small region using the same restoration filter regardless of the small region being the positive side (right side) or negative side (left side) from the center.

The restoration unit 63 generates a stereoscopic view image from the viewpoint images obtained by restoring the individual small regions regarding degradation, and stores it in the VRAM 50 again as the stereoscopic view image after the restoration.

This stereoscopic view image after the restoration in the VRAM 50 is outputted to the liquid crystal monitor 30, and the excellent subject image in 3D is displayed on the display screen of the liquid crystal monitor 30. Namely, preferable timing of the restoration to be performed is before the outputting of the stereoscopic view image to the liquid crystal monitor 30.

However, the stereoscopic view image after the restoration in the VRAM 50 is not necessarily outputted to the liquid crystal monitor 30, but may be outputted to the memory card 54, that is, recorded in a compression manner without outputting to the liquid crystal monitor 30. Playback of this stereoscopic view image after the restoration recorded in the memory card 54 on other stereoscopic view displays can also realize display of the excellent subject image in 3D.

In the deconvolution processing in the restoration unit 63 using the first to fourth filters as above, the restoration using the restoration filter according to the image height and defocus amount is performed regarding image quality of the small regions at the corresponding positions between the individual viewpoint images. Therefore, even in the neighboring portion of the image center or the peripheral portion apart from the image center, the restoration can be performed such that the image quality between the viewpoint images is uniform.

Moreover, when the restoration filter is the second filter, the image quality between the viewpoint images is uniform even in case of change in optical characteristics such as a zoom position and F-value.

Moreover, when the restoration filter is the third or fourth filter, the corresponding viewpoint images are restored using the common restoration filter and the memory consumption in the restoration filter storage 62 can be reduced.

{Reference Signs List}

12: image capturing lens, 14: aperture, 16: CCD, 61: defocus map creation unit, 62: restoration filter storage, 63: restoration unit

The invention claimed is:

1. A three-dimensional imaging device configured to output first and second viewpoint images due to a pupil division on a light flux from a single imaging optical system, comprising:
  a calculation unit configured to calculate a defocus amount at each position in the first and second viewpoint images;
  a restoration filter storage configured to store restoration filters corresponding to the defocus amount and an image height at each position in the viewpoint images, the restoration filters being deconvolution filters based on a point image intensity distribution representing an imaging performance of the imaging optical system; and
  a restoration unit configured to select a restoration filter, which corresponds to the defocus amount and the image height at each position in the viewpoint images, for each position in the first and second viewpoint images, and to restore the first and second viewpoint images by performing a deconvolution for each position in the first and second viewpoint images based on the selected restoration filter.

2. A three-dimensional imaging device configured to output first and second viewpoint images due to a pupil division on a light flux from a single imaging optical system, comprising:
  a defocus map calculation unit configured to calculate a defocus map representing a defocus amount at each position in the first and second viewpoint images;
  a restoration filter storage configured to store restoration filters corresponding to the defocus amount and an image height at each position in the viewpoint images, the restoration filters being deconvolution filters based on a point image intensity distribution representing an imaging performance of the imaging optical system; and a restoration unit configured to select a restoration filter, which corresponds to the defocus amount and the image height at each position in the viewpoint images, for each position in the first and second viewpoint images, and to restore the first and second viewpoint images by performing a deconvolution for each position in the first and second viewpoint images based on the selected restoration filter.

3. The three-dimensional imaging device according to claim 1, wherein the restoration filter storage stores a restoration filter for each optical characteristic regarding the imaging optical system.

4. The three-dimensional imaging device according to claim 3, wherein the optical characteristic includes a focal distance and/or an aperture value.

5. The three-dimensional imaging device according to claim 1, wherein the restoration filter storage stores a restoration filter for each position along a parallax direction and the image height in the first and second viewpoint images.

6. The three-dimensional imaging device according to claim 5, wherein the restoration filter storage stores a restoration filter which corresponds to each of the image heights of small regions obtained by dividing a region in the first and second viewpoint images into a number N1 along the parallax direction and dividing the region in the first and second viewpoint images into a number N2 smaller than the number N1 along a direction perpendicular to the parallax direction.

7. The three-dimensional imaging device according to claim 5, wherein the restoration filter storage stores a restoration filter common to the first and second viewpoint images.

8. The three-dimensional imaging device according to claim 7, wherein the restoration unit restores, based on a reference restoration filter as a restoration filter which is stored in the restoration filter storage and corresponds to one of the first viewpoint image and the second viewpoint image, the one viewpoint image, and restores, after obtaining a mirror inversion restoration filter as a restoration filter corresponding to the other of the first viewpoint image and the second viewpoint image by performing mirror inversion on the reference restoration filter, the other viewpoint image based on the mirror inversion restoration filter.

9. The three-dimensional imaging device according to claim 5, wherein the restoration filter storage stores a restoration filter corresponding to the image height and the defocus amount for each small region of an image along one of positive and negative directions in the parallax direction.

10. The three-dimensional imaging device according to claim 1, comprising an output unit configured to output a stereoscopic image based on the first and second viewpoint images restored by the restoration unit.

11. A viewpoint image restoration method comprising:

a step of calculating a defocus amount at each position in first and second viewpoint images obtained by a pupil division on a light flux from a single imaging optical system;

a step of storing restoration filters corresponding to the defocus amount and an image height at each position in the viewpoint images, the restoration filters being deconvolution filters based on a point image intensity distribution representing an imaging performance of the imaging optical system; and a step of selecting a restoration filter, which corresponds to the defocus amount and the image height at each position in the viewpoint images, for each position in the first and second viewpoint images, and restoring the first and second viewpoint images by performing a deconvolution for each position in the first and second viewpoint images based on the selected restoration filter.

12. A viewpoint image restoration method comprising:

a step of calculating a defocus map representing a defocus amount at each position in first and second viewpoint images obtained by a pupil division on a light flux from a single imaging optical system;

a step of storing restoration filters corresponding to the defocus amount and an image height at each position in the viewpoint images, the restoration filters being deconvolution filters based on a point image intensity distribution representing an imaging performance of the imaging optical system; and a step of selecting a restoration filter, which corresponds to the defocus amount and the image height at each position in the viewpoint images, for each position in the first and second viewpoint images, and restoring the first and second viewpoint images by performing a deconvolution for each position in the first and second viewpoint images based on the selected restoration filter.

13. The viewpoint image restoration method according to claim 11, comprising a step of storing a restoration filter for each optical characteristic regarding the imaging optical system.

14. The viewpoint image restoration method according to claim 13, wherein the optical characteristic includes a focal distance and/or an aperture value.

15. The viewpoint image restoration method according to claim 11, comprising a step of storing a restoration filter for each position along a parallax direction and the image height in the first and second viewpoint images.

16. The viewpoint image restoration method according to claim 15, comprising a step of storing a restoration filter which corresponds to each of the image heights of small regions obtained by dividing a region in the first and second viewpoint images into a number N1 along the parallax direction and dividing the region in the first and second viewpoint images into a number N2 smaller than the number N1 along a direction perpendicular to the parallax direction.

17. The viewpoint image restoration method according to claim 15, comprising a step of storing a restoration filter common to the first and second viewpoint images.

18. The viewpoint image restoration method according to claim 17, comprising steps of:

restoring, based on a reference restoration filter as a restoration filter which is stored and corresponds to one of the stored first viewpoint image and the second viewpoint image, the one viewpoint image; and restoring, after obtaining a mirror inversion restoration filter as a restoration filter corresponding to the other of the first viewpoint image and the second viewpoint image by performing mirror inversion on the reference restoration filter, the other viewpoint image based on the mirror inversion restoration filter.

19. The viewpoint image restoration method according to claim 15, comprising a step of storing a restoration filter corresponding to the image height and the defocus amount for each small region of an image along one of positive and negative directions in the parallax direction.

20. The viewpoint image restoration method according to claim 11, comprising a step of outputting a stereoscopic image based on the restored first and second viewpoint images.

\* \* \* \* \*